United States Patent [19]

Mouille et al.

[11] Patent Number: 5,007,799
[45] Date of Patent: Apr. 16, 1991

[54] FLAPPING RESTRAINER DEVICE FOR ROTORCRAFT ROTOR BLADES, AND ROTOR HEAD COMPRISING SAID DEVICE

[75] Inventors: René L. Mouille, Aix-en Provence; Robert J. Suzzi, Marseille, both of France

[73] Assignee: Societe Nationale Industrielle et Aerospatiale, Paris, France

[21] Appl. No.: 411,128

[22] Filed: Sep. 22, 1989

[30] Foreign Application Priority Data

Sep. 23, 1988 [FR] France ............................. 88 12491

[51] Int. Cl.$^5$ ............................................. F01D 3/00
[52] U.S. Cl. ................................... 416/104; 416/107; 416/131; 416/140
[58] Field of Search ................. 416/98, 103, 104, 105, 416/106, 107, 144, 145, 131 R, 131 A, 139 R, 139 A, 140 R, 140 A, 44

[56] References Cited

U.S. PATENT DOCUMENTS

| | | | |
|---|---|---|---|
| 2,640,584 | 6/1953 | Campbell | 416/106 |
| 3,147,810 | 9/1964 | Mosinskis | 416/103 |
| 3,591,310 | 7/1971 | Mouille | 416/107 |
| 3,923,419 | 12/1975 | Mouille | 416/107 |
| 4,178,130 | 12/1979 | Ferrris et al. | 416/140 A |
| 4,369,019 | 1/1983 | Lovera et al. | 416/190 A |
| 4,808,075 | 2/1989 | Pariani et al. | 416/106 |

FOREIGN PATENT DOCUMENTS

948570 1/1949 France.
2584996 1/1987 France.
2139171 11/1984 United Kingdom.

Primary Examiner—Edward K. Look
Assistant Examiner—Hoang Nguyen
Attorney, Agent, or Firm—Armstrong, Nikaido, Marmelstein, Kubovcik, & Murray

[57] ABSTRACT

The invention relates to a flapping restrainer device for the blades of a rotorcraft main rotor, and a rotor head comprising the same. The lower restrainers comprise a reciprocal star-shaped plate (32), having as many radial branches (33) as blades, and each one of the branches being engaged into a radial opening (6) of the hub (3). Outside the latter, the star-shaped plate (32) cooperates with supporting runners (47) integral with the blades. The upper restrainers comprise, for each blade, a stop which is retractable by the effect of the centrifugal force and which is composed of a lever (52), pivoting on a pivot (53) carried by the hub (3), and a first arm (55) of which constitutes a stop finger directed towards an upper supporting component (60) integral with the blade, while a second arm (56) carries a governor weight (57) and a nose (58) for support against a shoulder (59) integral with the hub (3).

21 Claims, 2 Drawing Sheets

FLAPPING RESTRAINER DEVICE FOR ROTORCRAFT ROTOR BLADES, AND ROTOR HEAD COMPRISING SAID DEVICE

BACKGROUND OF THE INVENTION

The present invention relates to flapping restrainer devices for the rotor blades of rotorcrafts.

More specifically, the invention relates to a flapping restrainer device which is intended to equip a main and articulated rotor head of a helicopter, and the flapping restrainer device according to the invention finds a particularly beneficial application in equipping rotor heads comprising integrated hub-masts, especially integrated hub-masts of the type comprising a monobloc tubular body, as described in French Patent Applications Nos. 2,584,995, 2,584,996 and 2,584,997 of the assignee.

In order to limit the downward flexion or angular flapping of the blades of the articulated main rotors of helicopters, under the effect of the blades' own weight, when the rotors are rotating at low speeds or when they are stationary, the rotor heads are generally equipped with flapping restrainers referred to as "lower restrainers", and numerous different constructions of lower restrainer devices have already been proposed.

One of these known constructions is particularly appreciated on account of the advantages which it exhibits, namely a structure which is very simple and inexpensive to manufacture, and has a mode of operation which is entirely satisfactory in service and exhibits a high degree of reliability. In this construction, the flapping restrainer device comprises a lower and central restrainer, which is common to all the blades, and comprising at least one rigid ring, referred to as "reciprocal", which is mounted so as to be displaceable laterally in relation to the rotor mast, and against which there are supported, when the rotor rotates at low speed or is stationary, rigid lower runners, each one of which is integral with a lower part of the root of a blade or with a component for connecting said blade to the hub of the rotor.

When the rotor rotates on the ground at a speed exceeding a given threshold, or in flight, for example when it rotates at its nominal speed, the mounting of each laterally displaceable reciprocal ring permits the inclination of the disc of the rotor by the cyclic control, on account of the fact that the blade which passes at the lowest position, in the course of its rotation about the axis of the rotor, pushes back each reciprocal ring on the opposite side, towards a blade which then passes to the highest position, and thus allows each reciprocal ring the possibility of being displaced laterally, without opposing the movements of the blades.

Such a lower flapping restrainer device incorporating at least one reciprocal ring likewise permits the pitch control of the blades, when the rotor is stationary, in such a manner as to control the free displacement of the pitch control. In fact, in this case, when a change of the pitch of the blades is commanded, the latter are supported on the reciprocal ring or rings by their lower supporting runners and entrain each reciprocal ring over a small rotation with a very slight sliding of the supporting surfaces.

Such lower flapping restrainer devices comprising lower supporting runners which are rigidly integral, in terms of movements, with the blades, and which are supported against a supporting track formed by the periphery of at least one reciprocal ring mounted to slide radially about the rotor mast and below the hub, are described, for example, in U.S. Pat. No. 2,742,098 and in French Patent 2,427,251 of the assignee.

In U.S. Pat. No. 2,742,098, the device for downwardly limiting the flappings of the blades of a rotorcraft main rotor comprises a lower and central restrainer incorporating two reciprocal rings superposed so as to slide freely in a radial plane within an annular and flat casing, concentrically surrounding the rotor mast, with which it is integral just below the hub. The radial movements of the reciprocal rings are limited by a restrainer ring, of smaller diameter, which is accommodated within the casing and within the reciprocal rings, and which can either rotate together with the mast, while presenting an external radial face which is concentric with the mast, or be fixed and eccentric in relation to the axis of the mast, while being supported by a fixed sleeve surrounding the mast, in order to permit a greater angular displacement of the blades towards the front of the rotor than towards the rear of the rotor. The casing accommodating the reciprocal rings exhibits radial slots, in which there engage runners, each one of which is rigidly integral with the components for connecting a blade to the hub, and projecting below these components, in order to come into contact against the external radial face of the reciprocal rings, in such a manner that, when the rotor is stationary or when the latter is rotating at low speeds, the angular flapping displacements of the blades are downwardly limited by the reciprocal rings, then occupying a middle position, precisely concentric with the axis of the rotor.

In the patent FR 2,427,251, which relates to rotors, the hubs of which are formed in a single piece with the corresponding rotor masts, in the form of integrated hub masts, to which the root of each corresponding blade is coupled via, on the one hand, retaining and articulation means comprising at least one laminated bearing or stop preferably spherical, having two armatures, one of which, in the external radial position in relation to the other, is fixed to the hub, and, on the other hand, a forked piece having two radial branches, which is integral with the blade root and the internal radial ends of the two branches of which are fixed to the other armature of the laminated bearing, there has been shown in FIGS. 3 and 5, and described with reference to these figures, a lower flapping restrainer device comprising a single metallic reciprocal ring, sliding radially and freely in a radial slot of a single annular piece, which is fixed about the rotor mast and below the hub, or of a plurality of supporting pieces regularly spaced over the periphery of the mast. This reciprocal ring cooperates with metallic lower restrainers, each one which is in a corner configuration and fixed by a wing against the lower face of the internal radial end of the lower branch of the forked piece for connecting a corresponding blade to the hub, the fixing being ensured by bolts for fixing the branches of this forked piece to the internal armature of the laminated spherical bearing.

However, these lower flapping restrainer devices incorporating a reciprocal ring exhibit a disadvantage when a gust of wind, occurring during the critical phases of start-up or of stopping of the rotor, when the speed of rotation of the latter is less than a given threshold, and therefore when the centrifugal force is not yet sufficiently high to stabilize the blades in their plane of rotation, pushes back one of the blades strongly in a downward direction, in such a manner that this blade is violently pressed onto the reciprocal ring which, not being subjected to sufficient reaction forces on the part of the other blades, adopts an extreme position, in which it does not prevent the blade which has been violently pushed back in a downward direction from reaching a dangerous position, of high inclination, and from possibly striking or even severing, by its end, the tail beam or the cabin of the helicopter. The same applies, when the rotor is stationary or when the latter is rotating only at low speed, when a blade is urged in an upward direction by a strong gust of wind. In this case, this blade which is thus urged may adopt a high angle of conicity, and then fall back heavily onto the reciprocal ring, possibly causing damage to this ring or to the supporting runner integral with the blade, and itself undergoing an instantaneous flexional torque which is far greater than the loads which it may normally encounter; this may lead to its being put out of service.

In order to remedy this disadvantage, without nevertheless renouncing the use of a common lower restrainer of the type incorporating a reciprocal ring, the advantages of which have been emphasized, it has already been proposed, especially by French Patents 948,570 and 2,434,079, to construct a flapping restrainer device combining lower restrainers incorporating a reciprocal ring and a lower runner for supporting the blades, and upper restrainers, limiting the angular displacements of the blades in an upward direction.

In this case, in fact, when a blade is violently urged angularly in a downward direction by a gust of wind when the rotor is stationary or rotating at low speed, the lower restrainer or lower supporting runner of this blade radially pushes back the reciprocal ring, which itself tends to push back the lower supporting runner of at least one of the other blades of the rotor, in the sense of the lifting of this other blade or of these other blades. However, this lifting is limited by the upper flapping restrainers which, when the rotor is stationary or rotates at low speed, are always in the working position. Thus, such a flapping restrainer device combines lower restrainers and upper restrainers which cooperate with one another in such a manner as to reduce the risks of damage to the rotor, when it is subjected to violent gusts of wind, while it is driven at a speed of rotation below a given threshold.

In the patent FR 948,570, the reciprocal ring is mounted so as to be resiliently laterally displaceable by a rubber ring or a plurality of rubber sleeves or blocks distributed about it, or alternatively by springs, which connect an upper face of the reciprocal ring, which is inclined with respect to the axis of the rotor pylon, to a lower face which is likewise inclined, of a crown integral with the rotor pylon, about the latter and just below the hub. In order to limit the angular displacement of the blades in a downward direction, fingers projecting below the blades are supported against the external peripheral surface of the reciprocal ring, which peripheral surface is preferably disposed at a radial distance which is as large as possible in relation to the axis of the rotor. The upper restrainers likewise comprise fingers projecting above the blades and directed radially towards the axis of the rotor, to come into contact against a fixed restrainer on the upper part of the hub, in order to limit the flappings of the blades in an upward direction.

Accordingly, the lower restrainers comprise a rigid reciprocal ring, which is resiliently displaceable, and which is thus restored towards its position concentric with the rotor axis, which cooperates with fixed lower supporting fingers of the blades, and the upper restrainers comprise restrainers which are situated at the top and fixed on the hub and which cooperate with upper and fixed supporting fingers of the blades.

In the patent FR 2,434,079 of the assignee, the reciprocal ring, which has a cross-section in the form of a reclining T, is mounted so as to slide radially by its thin internal part engaged into the forks presented at their lower part by three calipers fixed by an upper elbowed element about the rotor mast and below the hub. A part made from synthetic material resistant to wear and to shocks is screwed against the internal face of the lower end of each caliper, to be thus inserted between the latter and the external radial face of the rotor mast, and one end of a spring blade is gripped between this part and the caliper which carries it, this spring blade being curved towards its other end in order to urge the internal edge of the reciprocal ring, in such a manner as to tend to maintain the latter in a mean position concentric with the axis of the rotor mast.

The lower supporting runner of each blade is a rigid piece, having a cross section in the form of a T, which is fixed by a wing against the lower face of the lower branch of the forked piece for connecting the blade to the hub, by bolts for fixing the internal radial ends of the two branches of this forked piece to an internal armature of a laminated bearing for the retention and articulation of this blade on the hub, and the substantially vertical face of the supporting runner which is opposite the reciprocal ring, and which is intended to cooperate with it, is covered with a covering in the form of a thin layer of a material having high resistance to shocks and to wear.

The upper restrainers comprise, for each blade, on the one hand an upper supporting runner, fixed against the upper face of the upper branch of the forked piece for connecting the blade to the hub, by bolts for fixing the internal radial ends of the two branches of this forked piece onto the internal armature of the laminated bearing for the retention and articulation of this blade on the hub and, on the other hand, a restrainer which is situated at the top and which is carried by the hub and can be retracted or drawn in by the action of the centrifugal force, to which it is subjected when the rotor rotates with a speed of rotation greater than a given threshold, which is sufficient to permit the control of the rotor by the flight commands of the rotorcraft.

Numerous different constructions of individual flapping restrainers for each blade and automatically retractable by the effect of the centrifugal force, against restoring springs which tend to bring them back into a working position, in which they limit the angular displacements of the blades on one side of their plane of rotation, have already been proposed to constitute lower restrainers as well as upper restrainers (see, for example, the patent FR 1,368,684). Each one of such restrainers most frequently comprises a pivoting lever, urged by a restoring spring, and a first arm of which constitutes a supporting restrainer per se, while a second arm carries a governor weight sensitive to the action of the centrifugal force, to cause pivoting of the lever against the restoring spring.

In the patent FR 2,434,079, the lever is elbowed and mounted to oscillate with radial play on a pivot, having an axis parallel to the axis of rotation of the rotor, and fixed, in the vicinity of the axial plane of symmetry of the corresponding blade at rest, on a rigid crown carried by the upper part of the hub, the spring maintaining the lever, when the rotor is stationary or rotating at low speeds of rotation, in such a manner that its first arm is in a position of stopping of the upper supporting runner of the corresponding blade, and that its second arm is supported, over a part of its length, against the crown supporting the pivot. The two arms of the elbowed lever form an angle such that the centrifugal force applied to the governor weight, when the rotor rotates, tends to overcome the restoring force of the spring and to cause pivoting of the lever in a direction such that its first arm is remote from the Opposite upper supporting runner on the corresponding blade. A ring of synthetic material having high resistance is mounted onto each pivot, between the latter and the corresponding pivoting lever, with which the ring exhibits a radial play sufficient for the shocks and forces transmitted by the upper supporting runner to the first arm of the pivoting lever to be directly transmitted to the crown by the second arm of this lever, and not to the pivot, in such a manner as to protect the latter from these shocks and forces.

In a lower flapping restrainer device comprising a reciprocal ring surrounding the rotor mast, having regard to the high rigidity which this reciprocal ring must exhibit, its weight is acceptable only if its diameter is relatively small; this is generally the case in the rotors of the prior art presented hereinabove, which are equipped with a tubular rotor mast of a fairly small diameter.

However, it has recently been proposed to equip modern helicopters with main rotors on which the mast and the hub are constructed in the form of an integrated tubular hub mast assembly. This has led the designers, for reasons of mass optimization of this hub mast assembly, to reduce the thickness of the mast and simultaneously to increase its diameter, in such a manner that the mounting of a lower restrainer reciprocal ring about such a hub mast leads to a prohibitive weight for this reciprocal ring.

For this reason, lower restrainer devices incorporating a reciprocal ring are mounted within integrated tubular hub masts, such as those described in its French Patents 2,584,995 and 2,584,996. These lower restrainer devices are, in particular, represented in FIGS. 1, 2, 5 and 6 of the patent FR 2,584,995 and in FIGS. 4 and 6 of the patent FR 2,584,996, and have described with reference to these Figures.

They comprise a reciprocal ring constructed of composite material surrounded by a band constructed of cemented steel, which is mounted radially and freely slidingly, within the hub mast, in an annular guide having a cross-section in the form of a reclining U and open radially towards the exterior, this guide being maintained coaxially in the hub mast by a support, which is likewise coaxial with the hub mast and essentially accommodated in the latter.

In the case where the hub mast is surmounted by a shroud, the support of the lower flapping restrainer which is central and common to the blades and which is formed by the reciprocal ring and its annular guide may be a support which is upwardly flared, carrying the central flapping restrainer by its narrowed lower part, while it is fixed to the shroud by its flared end. In the absence of a shroud, this support may likewise comprise a frustoconical portion internal to the hub mast and carrying the lower and central flapping restrainer by its minor base, while its major base is extended by a portion which is flared and turned down outside the hub mast, above the free upper edge of the latter, to which the support is fixed by screws. However, with or without a shroud on the rotor mast, it is likewise possible that the support of the central flapping restrainer comprises a substantially frustoconical tubular bearing surface for support against the internal face of the mast, and a tubular centering shell, likewise substantially frustoconical, which is integral with the bearing surface and which supports the central flapping restrainer.

In order to cooperate with the reciprocal ring internal to the hub mast, and for each blade, a rigid supporting runner is fixed against the lower face of the internal radial end of the lower branch of a forked piece for connecting the blade to the hub, by bolts for fixing the internal radial ends of the two branches of this forked piece to the internal armature of a spherical laminated bearing for the retention and articulation of the corresponding blade on the hub and, as on this type of integrated tubular hub mast, the lower branch of this forked piece traverses an opening formed in the wall of the hub mast, and that at least the lower part of the laminated spherical bearing and of its internal armature is likewise accommodated in the hub mast, the supporting runner is itself accommodated in the latter.

Thus, on account of the arrangement of the reciprocal ring within the hub mast, the diameter and therefore the mass of the reciprocal ring are less than they would be if this reciprocal ring were mounted about the hub mast.

However, on account of the fact that the lower supporting runners, which are integral in terms of movement with the blades are likewise accommodated within the hub mast, this gives rise to major disadvantages regarding the construction and the utilization of such hub masts.

In fact, as the mounting of these runners below the internal ends of the lower branches of the forked pieces for connecting the blades to the hub is carried out at the same time as the internal ends of the two branches of these forked pieces are fixed to the internal armatures of the laminated bearings, after introduction, on the one hand, of at least the lower branches of these forked pieces into corresponding and lateral openings of the hub mast and, on the other hand, of the laminated bearing into the hub mast through the free opening at the upper end of the latter, it is necessary, for reasons of accessibility to the runners, to provide in the wall of the hub mast openings for passage of said lower branches which are of a size very much greater than that which is sufficient to permit, in service, the displacements of the blades about their pitch, flapping and drag axes. However, the formation of openings of such a size in the hub mast results in causing fragility of the latter to a considerable extent. Furthermore, in order to proceed with the maintenance and servicing operations at the location of the reciprocal ring and of the supporting runners of the blades, in order to replace, for example, the wear components mounted on these elements or these elements themselves, the accessibility through the opening of the upper end of the hub mast is insufficient on account of the fact that these elements are disposed below the laminated bearings and the portions of the connecting branches fixed to the latter, and on account of the bulkiness of these components within the upper part of the hub mast, which constitutes the tubular hub body.

Furthermore, for the practical construction of such a lower restrainer by reciprocal ring internal to the mast, it is difficult, and in certain cases impossible, to accommodate the rigid supporting runner integral with the forked piece for connecting the blade to the hub, in such a manner that it does not come to be restrained on the internal wall of the mast in the course of the maximum upward angular displacement of the blade and thus of the forked piece for blade-hub connection, especially in the case where the internal diameter of the frustoconical mast diminishes rapidly in the direction from the mast root.

These displacements of the blades are, in fact, in the order of 27°, with respectively +20° upwards and −7° downwards.

Moreover, the lower restrainer components of the blades must accept the recovery of the supporting torque of the blades, which is equal to the product of the weight of the blade (from 30 to 100 kg for helicopters of medium tonnage) and the distance from the center of gravity of the blade to its center of pivoting on the hub (a distance amounting to 5 to 9 meters for medium-sized helicopters).

This supporting torque, which is already naturally high, must be multiplied by an increasing coefficient of 2 to 3 in order to take account of the most unfavourable case of loading, which is that of the rolling on the ground over bumpy terrain, of a towed helicopter with the rotor stationary.

This large supporting torque, with the rotor stationary, is absorbed by the lower restrainer device which, in order not to be urged by prohibitive forces, demands the provision, between the center of pivoting of the blade and the point of support of the lower restrainer, of a lever arm having the greatest possible length.

However, if this lever arm is increased, there is also an increase in the space required for the displacements of the mechanism at the extreme angles and, consequently, in the bulkiness of the lower restrainer element connected to the sleeve.

Given, on the one hand, the need to over-dimension the thickness of the mast in the zone where the passage holes for the lower element of the forked piece for the blade-hub connection are formed and, on the other hand, the requirements for free displacement of the supporting runner connected to this forked piece, it is very difficult to accommodate within the mast all the components of the lower restrainer mechanism having a reciprocal ring.

In order to limit the displacements of the blades on one side and/or on the other side of the plane of rotation of the blades of a rotor incorporating an integrated tubular hub mast the patent FR 2,584,997 of the assignee likewise discloses a flapping restrainer device which comprises a central restrainer, fixed coaxially in the hub mast and carrying at least one restrainer surface axially bordering on a concave bearing surface, and limiting the displacements of the internal radial armatures of the laminated bearings by contact with lugs projecting radially towards the interior on these armatures, on one side and/or on the other side of a convex bearing surface machined in the base of recesses formed in the internal radial faces of these armatures, and sliding against the concave bearing surface of the central restrainer.

However, such a flapping restrainer device, although suitable for the integrated hub mast of a helicopter rear rotor, the plane of rotation of which is substantially vertical, is not appropriate for equipping a hub mast of this type, for a main rotor, the plane of rotation of which is substantially horizontal. In fact, the moment of embedding of the blades of a main rotor in the hub, this being a moment resulting from the weight of the blade multiplied by the distance of its center of gravity from the flapping articulation, being very high, cannot be accepted by this type of flapping restrainer, essentially by reason of the small constant lever arm between the supporting lugs and the center of rotation of the laminated bearings.

SUMMARY OF THE INVENTION

The object of the invention is to propose a flapping restrainer device, which is intended, in particular, for the main rotor heads which are equipped with an at least partially tubular hub mast assembly, and which preserves the advantages procured by lower restrainers incorporating a reciprocal ring accommodated within the hub mast assembly, without exhibiting the disadvantages thereof which are mentioned hereinabove.

A further object of the invention is to propose a flapping restrainer device comprising upper restrainers, the effects of which are advantageously combined with lower restrainers according to the invention.

Yet a further object of the invention is to propose a rotorcraft main rotor head which is advantageously equipped with a downward flapping restrainer device and, preferably, also with upward flapping restrainer device, according to the invention.

In order to achieve this object, the subject of the invention is a flapping restrainer device for the blades of a rotorcraft main rotor, of the type comprising a hub mast assembly exhibiting at least one tubular part below means for the retention and articulation of the blades on the hub, the device according to the invention comprising lower flapping restrainers comprising at least one rigid component for the reciprocal support of the blades, which is mounted to slide radially on a support fixed coaxially in said tubular part of the hub mast assembly and, for each blade, a lower supporting runner, which is integral in terms of movement with the blade root in such a manner as to limit the displacements of the blade in a downward direction by cooperation with the rigid component for the reciprocal support of the blades, and this device is defined in that said component is a plate integral with branches, the number of which is equal to that of the blades and which are regularly distributed in a circumferential direction about the plate, each extending towards the exterior in a general direction which is substantially radial in relation to said plate, and in being each engaged into an opening formed in the hub mast assembly, and each lower supporting runner is essentially external to the hub mast and is restrained against the external radial end of a branch, in order to limit the downward flappings of the corresponding blade.

It emerges from this that such a flapping restrainer device remains of little bulkiness and reliable, since its plate for the reciprocal support of the blades and, where appropriate, the major part of the branches are accommodated within the hub mast assembly, in such a manner that the advantages of a reciprocal ring of small diameter and of limited weight are preserved. Furthermore, the industrial construction of such a device remains simple and economic. The mass surplus which may possibly be due to the presence of the branches is to a great extent compensated by the gains in accessibility at the location of the connections of the lower supporting runners to the blades or components for connecting the blades to the hub, and at the location of the contacts of these runners against the ends of the branches connected to the support plate. In this way, the wear elements on the runners and on the branches may be exchanged without any further demounting.

Furthermore, when the hub mast assembly is a tubular assembly which is flared from its lower part, forming the rotor mast, towards its upper part, forming the hub, at least as far as the location of the means for the retention and articulation of the blades on the hub, and when the integrated tubular hub mast thus constructed does not become narrowed substantially above this location, it is possible to demount the support plate and the branches which it carries through the opening of the upper end of the hub mast, without any need to separate this hub mast from the gear box, in which it is embedded and by which it is driven in rotation about its axis, which is the axis of rotation of the rotor.

In consequence, the construction of the rigid component for the reciprocal support of the blades in the form of a central support plate which is extended towards each blade by a radial extension or branch passing through an opening of the hub mast, permits the installation and the dimensioning of this support plate with radial extensions as well as of the supporting runners with which it cooperates, in an easy manner. In fact, for each blade, the lower supporting runner and its support arm are situated outside the rotor mast and can be fixed directly onto a component for connecting the blade to the hub.

In order to ensure a good rigidity in the transverse direction of the branches connected to the support plate, it is advantageous that these branches should each exhibit a shape which is substantially rectangular in plan, and a substantially constant thickness.

In order to facilitate the industrial construction of the assembly comprising the rigid support plate and the branches, this assembly is advantageously constructed in the form of a star, with as many branches as there are blades of the rotor, and preferably exhibiting a circular central recess lightening the star in its central part which is virtually not urged.

In order to construct such a star-shaped plate of a minimal weight, but nevertheless of a sufficiently great transverse rigidity, it is advantageous that this star-shaped plate should be a plate of laminated composite materials, comprising a stack of layers or plies of fabrics or laps of synthetic or inorganic fibers of high mechanical strength and which are agglomerated by a polymerized synthetic resin.

In this case, in order to protect the external radial end of each laminated branch, on the one hand, against the shocks of the supporting runners, which might involve a matting force which is too large for these laminated ends, and, on the other hand, against the wear which could result from small relative movements of the supporting runners on these ends, each branch is equipped, at its external radial end, with a contact shoe projecting through the corresponding opening of the hub mast assembly and outside the latter.

In order further to facilitate the maintenance and servicing operations, it is then advantageous that each contact shoe should be a metallic shoe removably mounted on the corresponding branch. Thus, each contact shoe is a part subject to wear which is attached, for example by bolting, onto the corresponding branch and capable of being exchanged without further demounting.

The same advantage may be substantially obtained at the location of the lower supporting runners of the blades, if each one of them is, for example, made integral with the root of the corresponding blade or with the component for connecting the corresponding blade root to the hub by a rigid connecting piece directly fixed below said blade root or said connecting component.

In fact, the supporting forces of the runners of the blades against the end shoes of the branches are very large, and the test of free displacement of the flight commands over their entire travel, with the rotor stationary, requires rollings and slidings, at the location of the supporting points, which are liable to create a wear and, consequently, to necessitate a relatively frequent replacement of the contact pieces. The arrangement of these pieces entirely outside the hub mast considerably facilitates this exchange operation, where required.

In order to provide favourable guiding of the star-shaped plate in its transverse displacements while constantly restoring it to the mean position in its plane and likewise in rotation, in order that it should thus not give rise to any imbalance in flight, it is advantageous that the star-shaped plate should slide radially by its lower face on a lower support plate and should be suspended by its upper face from an upper support component, by means of at least one resilient restoring component, said lower plate and said upper support component being fixed radially in the hub mast assembly.

In an advantageously simple embodiment, the resilient component is a coaxial crown or a set of studs distributed coaxially in the circumferential direction, said crown or said pins being constructed of a resiliently deformable material, such as an elastomer. Furthermore, the lower support plate and the upper support component advantageously define a seating of revolution about the axis of the rotor.

In order to permit the start-up and the stopping of the rotor under conditions of high wind, in complete safety, the flapping restrainer device according to the invention is advantageously of the type further comprising upper restrainers which comprise, for each blade of the rotor, an upper supporting component, which is integral in terms of movement with the root of the corresponding blade, and an independent upper stop which is automatically retractable by the centrifugal force, and comprising a lever which is mounted to oscillate on a pivot integral with the hub, and a first arm of which is conformed as a stop finger, while a second arm, on the one hand, carries a governor weight and, on the other hand, exhibits a supporting part intended to come against a supporting surface integral with the hub, as well as a restoring spring, urging the lever in such a manner as to restore it or to maintain it, when the speed of rotation of the rotor is below a given threshold, in a stationary position, in which the supporting part of the second arm of the lever rests against the supporting surface integral with the hub, and the stop finger of the lever is directed towards the corresponding upper supporting component, in such a manner as to limit the upward displacements of the corresponding blade, by the coming of the supporting component against the stop finger, and such that, when the speed of rotation of the rotor exceeds the given threshold, the centrifugal force applied to the governor weight causes pivoting of the lever against the spring and in a direction such that the stop finger is separated from the corresponding upper supporting component, in such a manner as not to oppose the upward displacement of the corresponding blade. In this case, in which the lower restrainers incorporating a reciprocal plate are supplemented by upper restrainers incorporating independent stops which are retractable by the centrifugal force, the flapping restrainer device according to the invention is further defined in that the axis of the pivot of each pivoting lever of a retractable stop is substantially perpendicular to the radial plane passing through the axis of the rotor and through the longitudinal axis of the corresponding blade, and this pivoting lever is mounted, between its ends, on the pivot in such a manner that its stop finger, in the lower position in relation to the pivot, is pivoted radially towards the interior from the stationary position, when the governor weight and the second arm, in the upper position in relation to the pivot, are pivoted radially towards the exterior by the centrifugal force.

Thus at low speed of rotation of the rotor or when the latter is stationary, if an angular displacement movement of a blade in an upward direction is initiated under the effect of the wind, the corresponding upper supporting component comes into contact with the stop finger of the lever in the stationary position; this prevents the continuation of this movement. On the other hand, when the speed of rotation of the rotor is greater than the given threshold, sufficient to permit an effective control of the rotor by the flight controls, the governor weight and the second arm of the lever are pivoted towards the exterior and the stop finger of the lever is pivoted towards the interior, in such a manner that nothing opposes the displacement in an upward direction of the upper supporting component with the blade, within the range of displacement traversed by the blade in service.

Advantageously, the pivoting lever is substantially straight and substantially vertical in the stationary position, and the supporting part of the second arm is a nose projecting substantially radially towards the interior and which is buttressed against the supporting surface integral with the hub, which surface is advantageously delimited by a shoulder which projects substantially radially towards the exterior on the hub, in such a manner that in the stationary position the lever behaves as a strut coming into contact, by its stop finger at its lower part, against the upper supporting component of the corresponding blade, and, by its nose, towards its upper end, against the shoulder integral with the hub. Under these conditions, any pivoting of the corresponding blade in an upward direction is impossible. For a given mass of the governor weight, the mode of action of the latter is optimal when it is situated at the free end of the second arm of the oscillating lever, the nose of this lever then projecting on the second arm, between the pivot and the governor weight.

In order to facilitate the mounting of each retractable stop on the hub, the supporting surface integral with the latter and the cap in which the corresponding pivot is mounted rotatably are mounted together by bolting on a component for the fixing on the hub of the means for the retention and articulation of the corresponding blade on the hub. This likewise permits the avoidance, on mounting, of any regulation of the relative positioning of said supporting surface and of the pivot.

When each blade is connected to the hub by a forked connecting piece, the corresponding upper supporting component is advantageously mounted within this forked piece, in order to be able to be positioned in proximity to the pivoting lever on the hub of the corresponding retractable stop.

The subject of the invention is also a rotor head, which is intended for a rotorcraft main rotor, and of the type comprising a hub mast assembly exhibiting at least one tubular part in communication with the exterior of the hub mast assembly by openings, the number of which is equal to that of the blades of the rotor and which are formed in the hub mast assembly and regularly distributed in the circumferential direction on the latter, about the axis of rotation of the rotor, below means for the retention and articulation on the hub of pieces for connecting the blades to the hub, as well as a flapping restrainer device incorporating lower restrainers comprising a reciprocal central restrainer mounted to slide radially on a support fixed coaxially in the tubular part of the hub mast assembly and, for each blade, a lower supporting runner fixed on the corresponding connecting piece, in such a manner as to limit the displacements of the blade in a downward direction by cooperation with the reciprocal central restrainer, and the flapping restrainer device is a device according to the invention and as presented hereinabove, each one of the branches of the rigid plate forming the reciprocal central restrainer of which is engaged into one of the openings of the hub mast assembly, in such a manner that its external radial end is opposite a corresponding lower supporting runner, outside the hub mast assembly.

It is clear that the rotor head according to the invention may advantageously be equipped with a hub mast assembly as described in the aforementioned French Patents of the assignee, which relate to integrated tubular hub masts, to which each blade is connected by a forked connecting piece having two attachment branches, of which at least the lower branch traverses an opening formed in the integrated tubular hub mast in order to be fixed, within the latter and by its internal radial end, to said means for the retention and articulation of this forked piece on the hub. In this case, for each blade, the corresponding lower supporting runner of the flapping restrainer device according to the invention is fixed so as to project below the corresponding forked piece, the lower attachment branch of which traverses the same opening of the hub mast as that in which there is engaged the branch of the reciprocal central restrainer which cooperates with the corresponding lower supporting runner. Thus, the integrated tubular hub masts are assemblies on which it is particularly advantageous to install a flapping restrainer device according to the invention, since such a hub mast already exhibits openings permitting the passage of the branches of the reciprocal central restrainer, whether the latter be a reciprocal plate extended by radial extensions or a starshaped plate incorporating substantially radial branches.

When the flapping restrainer device equipping the rotor head according to the invention likewise comprises upper restrainers, each retractable stop of which comprises a pivoting lever, the second arm of which carries a nose, as presented hereinabove, the rotor head is then advantageously such that the means for the retention and articulation of each connecting piece on the hub comprise an armature maintained on a part of the hub by a fixing ferrule retained against the periphery of this hub part. For example, these means for the retention and articulation may preferably be a laminated spherical bearing the external radial armature of which is conformed as a caliper straddling from the interior towards the exterior a reinforcing rim of the hub, and retained on this rim by the fixing ferrule, applied against the external radial face of the rim and of the caliper. In fact, the fixing ferrule may then support, projecting substantially radially towards the exterior, on the one hand a cap in which the pivot of the lever of the corresponding retractable upper stop is rotatably mounted and, on the other hand, a shoulder against which the nose of this pivoting lever is supported, in the stationary position. This results in a considerable simplification of the mounting and the relative positioning of the various elements constituting the upper restrainers.

At the same time, it is moreover advantageous that the rotor head according to the invention should be such that the piece for connecting each blade to the hub should be a sleeve, the internal radial part of which is conformed as a cap having two branches for the attachment on another armature of the means for the retention and articulation to the hub, for example on the internal radial armature of a laminated spherical bearing constituting these means, this other armature being in an internal radial position in relation to the armature maintained on the hub by the aforesaid fixing ferrule. In fact, in this case, the corresponding upper supporting component cooperating with the stop finger of the corresponding pivoting lever, in order to limit the displacements of the corresponding blade in an upward direction, may be easily constructed in the form of a frustoconical surface portion, formed within the sleeve and/or between the two attachment branches of the internal radial cap of the latter, which surrounds the pivoting lever. The upper restrainers are thus protected within the sleeves for the connection of the blades to the hub.

Finally, in order to avoid the presence of a large number of fixing means on the hub mast assembly of the rotor heads according to the invention, the coaxial support of the reciprocal central restrainer of the flapping restrainer device which equips them is fixed to the hub assembly by means fixing simultaneously on the latter a fastener, on which there is articulated a rotating compass for driving in rotation the rotating plate of a pitch control device incorporating cyclic plates, which is mounted about the hub mast assembly.

BRIEF DESCRIPTION OF THE DRAWINGS

The invention will be better understood, and further features and advantages of the invention will emerge from the description of an embodiment, which is described hereinbelow on a non-limiting basis with reference to the accompanying drawings, in which.

DETAILED DESCRIPTION OF THE PREFERRED EMBODIMENT

Figure 1:
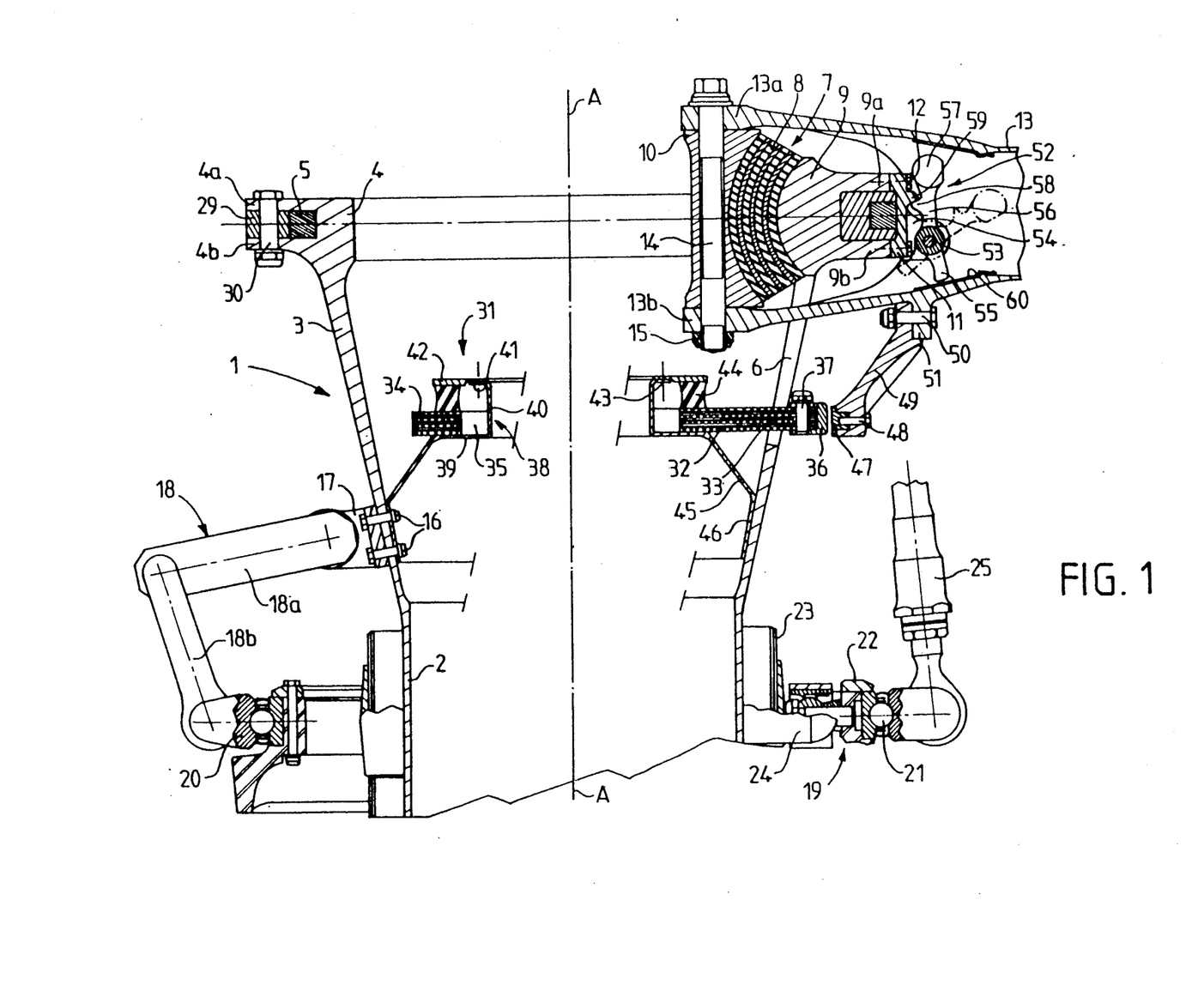
FIG. 1 is a partial view, partly in cross-section through two radial half-planes, and partly in side elevation, of the head of a four-blade main rotor of a helicopter and, FIG. 2 is a partial view, partly in cross-section along the plane of rotation of the blades, partly in horizontal cross-section through the reciprocal common restrainer, and partly in plan, of the rotor head of FIG. 1.
Figure 2:
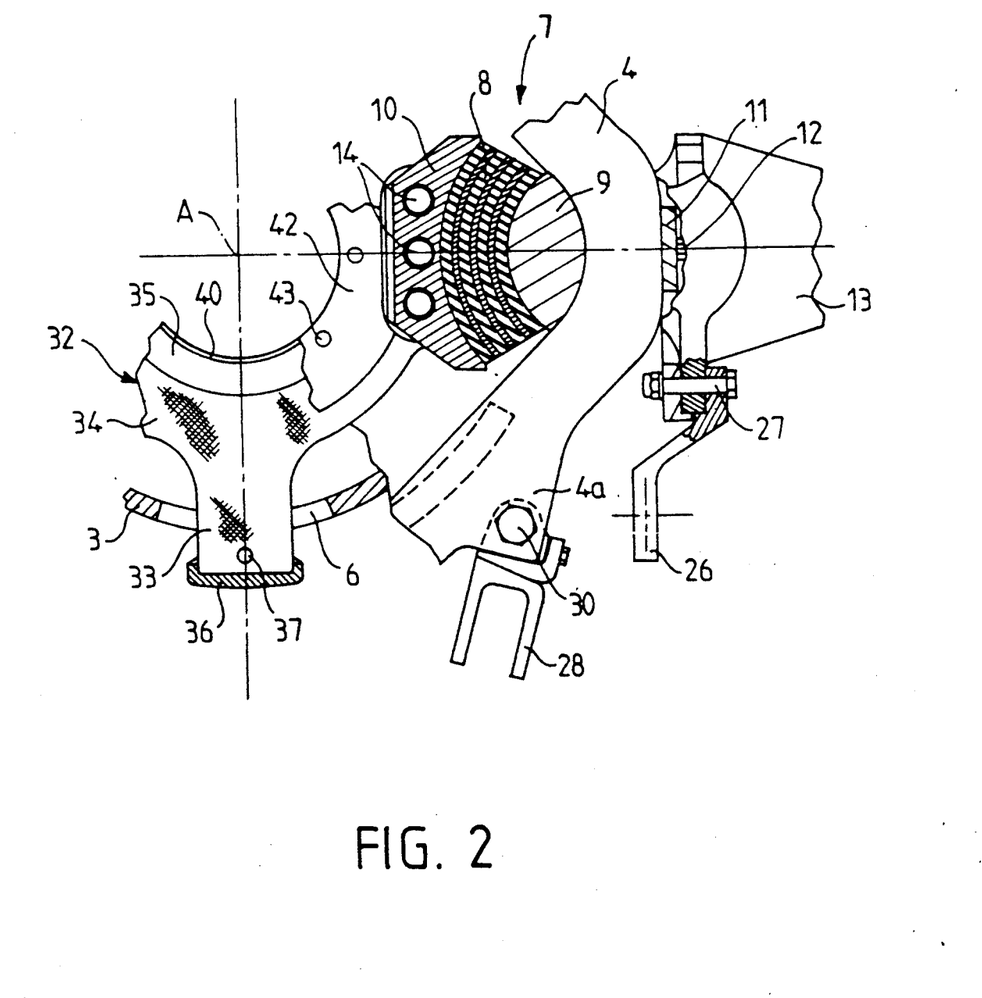

The four-blade main rotor head of a helicopter which is represented in FIGS. 1 and 2 is of the same type as those described in the patent FR 2,584,996 which is incorporated by way of reference in the present specification, and to which reference will advantageously be made for further specific details.

This rotor head comprises an integrated tubular hub mast 1, which essentially comprises a monobloc tubular body of axis A corresponding to the axis of rotation of the rotor, and the lower part of which forms a tubular rotor mast 2, of cylindrical external general shape of circular cross-section, by the root of which the hub mast 1 is embedded in the main gear box of the helicopter and driven in rotation about its axis A by the latter. The upper part of the hub mast 1 forms a tubular hub body 3, which directly extends the mast 2 and exhibits an external general shape which is substantially frustoconical or in the form of a frustum of a pyramid having a substantially square base with round vertices and is flared from the mast 2 as far as its free upper end, which is given excess thickness locally and peripherally in the form of a reinforcing rim 4, of substantially rectangular transverse cross-section and projecting essentially radially towards the exterior of the hub body 3. This rim 4 exhibits a peripheral throat, opening radially towards the exterior, and in which there is received a reinforcing belt 5, made of composite materials, and for example constructed by winding in this throat unidirectional rovings of synthetic or inorganic fibers of high mechanical strength (carbon or aramid fibers) impregnated with a polymerizable synthetic resin, such as an epoxide resin, which is then polymerized and cured. The monobloc tubular body 1 forming the mast 2, the hub 3, and the rim 4, may be metallic, for example of steel or of titanium, and constructed from a drop-forged or forged blank. However, it is also possible to construct it of composite materials, by winding of rovings or draping of layers or plies of fiber fabrics of high mechanical strength and agglomerated by a polymerized synthetic resin.

Radial openings 6, which are identical and the number of which is equal to that of the blades of the rotor, i.e., 4 openings 6 in this example, are formed in the portion of the hub 3 which is directly adjacent to the rim 4, and are regularly distributed in the circumferential direction on the periphery of this portion of the hub 3, each one of the openings 6 being formed in a part of the hub 3 forming below the rim 4 a rounded vertex of its substantially square cross-section.

Each one of the four blades (not shown) is connected to the hub 3 by components for retention and articulation which comprise a spherical laminated bearing 7, the central part of which, in the form of a portion of a sphere, is formed of an alternating and adhered stack 8 of rigid cups and of resiliently deformable layers of elastomer, in the form of spherical domes, this stack 8 being vulcanized, on the one hand, by the concave external radial face of its external layer of elastomer, against the convex internal radial face of an external armature 9 and, on the other hand, by the convex internal radial face of its internal layer of elastomer against the concave external radial face of an internal armature 10, the two armatures 9 and 10 and the rigid cups of the stack 8 being, for example, metallic. Each spherical laminated bearing 7 is applied against the internal radial face of the rim 4, above an opening 6, and is fixed against the rim 4 by its external armature 9, which is conformed in its external part in the form of a caliper open radially towards the exterior, in order to straddle by its upper arm 9a and its lower arm 9b the upper and lower faces respectively of the rim 4, and a fixing ferrule 11 is applied against the external radial face of the rim 4, of the belt 5 and of the arms 9a and 9b of the caliper, and is fixed to these arms by radial screws 12. The laminated spherical bearing 7 thus constitutes an articulation bearing, which is retained substantially within the opening delimited at the upper end of the hub 3 by the rim 4, and which permits limited angular displacements about its bearing or rotation center, which is situated in the belt 5 and which corresponds to the center of curvature of the spherical domes and the convex and concave surfaces of the elements of this laminated spherical bearing 7.

Each blade is attached to the corresponding laminated spherical bearing 7 by a radial connecting sleeve 13, the internal radial part of which is conformed as a cap incorporating two attachment branches spaced vertically, one above the other, and this sleeve 13 is thus disposed in such a manner that the upper branch 13a of its internal cap extends towards the axis A while passing above the laminated bearing 7 and the rim 4, while its lower branch 13b extends within the hub 3 while passing through the corresponding opening 6, and the internal radial ends of the branches 13a and 13b are fixed against the opposite axial faces of the internal armature 10 of the laminated bearing 7 by bolts 14, of axis parallel to the axis A and retained by their head on the upper branch 13a, and the shanks of which traverse aligned holes formed in the branches 13a and 13b and in the internal armature 10, spring-action or keyed nuts 15 being screwed onto threaded lower ends of these bolt shanks, projecting below the lower branch 13b, and tightened against the latter. The internal armature 10 is thus mounted as a spacer between the two branches 13a and 13b of the internal cap of the sleeve 13, the external radial part of which (not visible in the Figures) may likewise be conformed as a cap, between the two branches of which the root of the corresponding blade is retained by two pins of axis parallel to the axis A and one of which may be removable in order to permit the "folding back" of the corresponding blade, in the plane of rotation of the rotor, by rotation of this blade about the other pin.

By such a connection of the sleeve 13 to the laminated spherical bearing 7, the elastomer layers of the latter operate on the one hand in compression on the transmission, to the rim 4 of the hub 2 and to its belt 5, of the centrifugal forces urging the blade, and, on the other hand, in shear to permit the angular movements of the blade about its longitudinal axis of change of pitch, about its drag axis, (parallel to the axis A) and about its flapping axis (perpendicular to the axis of change of pitch and in the plane of rotation of the blades), these three axes being concurrent at the centre of rotation of the laminated bearing 7 and perpendicular in twos.

Bolted connections 16 fix on the external face of the hub mast 1 a fastener 17 on which there is articulated the upper branch 18a of a rotating compass 18, the lower branch 18b of which is articulated on the rotating plate 20 of a cyclic plate device designated as a whole by the reference 19. This compass 18 drives in rotation, together with the hub mast 1, the rotating plate 20 rotatably mounted by the bearing 21 about the non-rotating plate 22, itself sliding axially about a tubular guide 23 surrounding the hub mast 1, and oscillating in all directions about the axis A by a bearing mechanism 24, under the action of the pilot controls, (not shown), and in such a manner that the translation and oscillation movements of the non-rotating plate 22 are transmitted by the rotating plate 20 to the sleeve 13 for connecting each blade to the hub 3 by a pitch control rod 25, which is articulated by a lower bearing member on the rotating plate 20 and by an upper bearing member on the end of a pitch control lever 26, which is fixed so as to project laterally on the sleeve 13 by a bolted connection 27 (see FIG. 2).

Each blade is likewise connected to the hub 3 by a resilient return drag brace with incorporated damping (not shown) also referred to as a drag damper or frequency adapter, and this component is disposed laterally between, on the one hand, the root of the blade or the external radial end part of its connecting sleeve 13, to which it is coupled by a bearing and, on the other hand, a portion of the rim 4, which is situated between the sleeve 13 of this blade had the sleeve 13 of an immediately adjacent blade, for example the following blade if the direction of rotation of the rotor is considered, and this component is coupled to the rim 4 by a bearing (not shown) retained in a fastener such as 28 made integral with the hub 3 by a tab 29 retained by a bolted connection 30 between the upper branch 4a and the lower branch 4b of a cap formed by a localized radial extension towards the exterior, of the edges of the rim 4, on either side of the throat accommodating the belt 5.

In order to limit the flappings of the blades in a downward direction and in an upward direction, when the speed of rotation of the rotor is less than a given threshold, being equal, for example, to one third of the nominal speed of rotation (and thus sufficient in order that a good control of the rotor should be ensured by the flight controls comprising the swashplate device 19), and in particular in order to permit, in complete safety, the start-up and the stopping of the rotor under conditions of high wind, the rotor head is equipped with a flapping restrainer device incorporating lower restrainers and incorporating upper restrainers, and as described hereinbelow.

The lower restrainers comprise a central restrainer 31, common to all the blades, and of the type referred to as "reciprocal", which is essentially mounted so as to be coaxial within the hub mast 1, and which comprises a star-shaped plate 32, having as many radial branches 33 as the rotor comprises blades, and the central part 34 of which is recessed by a circular opening 35. The star-shaped plate 32 is laminated in composite materials, and is formed by a stack of layers or plies of fabrics of carbon or glass fibers, which are pre-impregnated with a thermosetting epoxide resin, the stack being formed in a mold in which it is compressed and the polymerized resin is hardened under hot conditions. This construction of laminated composite materials permits the obtaining of a high transverse rigidity of the plate for a minimal weight. Each one of the four branches 33 of the plate 32 exhibits a shape which is substantially rectangular in plane (see FIG. 2) and has a substantially constant thickness (see FIG. 1), and a metallic contact shoe 36, constituting a wear element, is removably mounted by a bolted connection 37 in such a manner as to straddle the external radial end of each branch 33. The star-shaped plate 32 is radially displaceable in a revolution piece 38, which is fixed coaxially about the axis A and within the hub mast 1, and arranged as a U-shaped seating, open radially towards the exterior, and in which the plate 32 is retained in such a manner that each radial branch 33 is engaged into an opening 6 of the hub 3 and exhibits its shoe 36 projecting outside the hub mast 1. The revolution piece 38 defining the U-shaped seating comprises a lower-support annular plate 39, on which the starshaped plate 32 can slide radially by the lower face of its annular central part 34, and the internal radial edge of the plate 39 is extended by a coaxial tubular chimney 40, traversing with radial play the central opening 35 of the star-shaped plate 32, the chimney 40 terminating at its upper end by an external radial flange 41, on which an upper-support annular plate 42 which is coaxial is fixed by bolted connections 43. A crown 44 constructed of a resiliently deformable material, for example constructed of elastomer, is adhered by its upper face below the external radial part of the upper plate 42, and by its lower face on the upper face of the annular central part 34 of the plate 32, about the central opening 35 of the latter. The chimney 40 constitutes a central abutment limiting the radial displacements of the star-shaped plate 32, which is resiliently restored by the elastomer crown 44 towards a centering mean position, which is coaxial, for the simultaneous support of the blades flexed in a downward direction on stopping the rotor. The crown 44 constituting a restoring spring may be replaced by elastomer studs, which are regularly distributed in the circumferential direction.

The lower support plate 39 is integral, by its external radial edge, with a frustoconical and coaxial centering shell 45, which is flared in a downward direction and which is extended by a frustoconical and coaxial bearing surface 46 for support against the internal face of the hub mast 1, on which face this bearing surface 46 is fixed by the bolted connections 16, which comprise those 16 simultaneously ensuring the fixing of the fastener 17 of the rotating compass 18 to the hub mast 1.

The lower restrainers likewise comprise, for each blade, a lower supporting runner 47, constituting a wear piece, and removably mounted by a bolted connection 48 on the lower end of a rigid connecting and supporting heel 49, being inclined in a radial plane from the bottom to the top and from the interior towards the exterior, and the upper end of which is fixed in a removable manner by a bolted connection 50 on a tab 51 forming a single piece with the corresponding connecting sleeve 13, and projecting below this sleeve 13.

When the speed of rotation of the rotor is below the given threshold, the heel 49 and its supporting runner 47 permit the limitation of the angular displacement of the sleeve 13 and of the corresponding blade in a downward direction, by pressing the runner 47 against the shoe 36 equipping the external radial end of the corresponding branch 33 of the star-shaped plate 32.

When all the blades simultaneously rest by their supporting runner 47 against the end shoes 36 of the branches 33 of the star-shaped plate 32, this plate 32 transmits the supporting forces while balancing them from one to the other of the blades, in such a manner that this plate 32 remains substantially centered on the axis A of the hub pylon 1.

When the rotor rotates at its normal operating speed, and when the pilot actuates the cyclic pitch control, the blade which passes into the lower position pushes back the plate 32 on the opposite side, this movement being permitted for the plate 32 by the fact that the diametrically opposite blade is in the top position.

After landing and at the time of stopping of the rotor, the return of the plate 32 into the centering mean position for the simultaneous support of all the blades is facilitated by the restoring ensured by the resilient crown 44.

The upper restrainers comprise, for each blade, a stop which is independent and retractable under the effect of the centrifugal force, which comprises a substantially straight lever 52, which is pivotably mounted by an intermediate part between its ends, on a pivot 53 having an axis, which is horizontal and perpendicular to the radial plane passing through the center of the corresponding laminated spherical bearing 7, and simultaneously through the middle of a cap having two vertical ears, which are parallel and radial, 54, projecting towards the exterior on the lower half of the corresponding fixing ferrule 11, and between which the pivot 53 is mounted. A spiral spring (not shown, for reasons of clarity), which is wound about the pivot 53, and one end of which is anchored in a cap ear 54, while the other end is anchored in the lever 52, urges this lever 52 in such a manner as to restore it towards the substantially vertical position which it occupies in solid lines in FIG. 1, and in which it extends substantially parallel to the ferrule 11, and radially outside the latter. The lever 52, which is thus accommodated within the corresponding connecting sleeve 13, exhibits, on either side of the pivot 53 extending below the longitudinal axis of this sleeve 13, a small lower arm 55, arranged as a stop finger directed, in this position, towards the internal face of the lower part of the sleeve 13, and a large upper arm 56, carrying a governor weight 57 at its free end, as well as a nose 58 projecting substantially radially towards the interior, between the pivot 53 and the governor weight 57, in such a manner that the upper face of the nose 58 constitutes a supporting surface against an opposite supporting surface delimited on the lower face of a shoulder 59 projecting substantially radially towards the exterior on the upper half of the ferrule 11.

The upper restrainers likewise comprise, for each blade, an upper supporting component constituted by an essentially frustoconical tubular section 60, having a reinforced internal surface, which is pressed into that part of the sleeve 13 situated at the base of the branches 13a and 13b, and which is itself slightly frustoconical and divergent towards the axis A, while surrounding the pivoting lever 52.

When the speed of rotation of the rotor is below the threshold, and when the corresponding lower supporting runner 47 is supported against the star-shaped plate 32, in the mean position, there is a slight play between the stop finger 55 of the lever 52, occupying the position in solid lines in FIG. 1, under the effect of the restoring spring, and the opposite supporting surface on the component 60, while the nose 58 is virtually applied against the shoulder 59.

Thus, the lever 52 opposes any significant angular displacement of the sleeve 13 and of the corresponding blade in an upward direction, in relation to the hub 3. In fact, if such a movement is initiated by the blade under the effect of the wind, the internal and lower supporting surface of the tubular section 60 of the sleeve 13 comes against the finger 55 of the lever 52, which is mounted with a sufficient play on the pivot 53 in order that its nose 56 should be buttressed against the shoulder 59 of the ferrule 11, without loading the pivot 53. Under these conditions, the lever 52 behaves as a rigid strut loaded in compression between the sleeve 13 and the shoulder 59, and which opposes the pivoting of the sleeve and of the blade in an upward direction.

On the other hand, when the rotor is started up and when the latter reaches a speed of rotation exceeding the aforementioned threshold, the governor weight 57, which is subjected to centrifugal force, causes pivoting of the lever 52 about the axis 53, against the action of the restoring spring, in such a manner that the upper arm 56 and the governor weight 58 are pivoted radially towards the exterior, which separates the nose 58 from the shoulder 59, and that, simultaneously, the stop finger 55 is pivoted radially towards the interior, which separates it from the opposite frustoconical supporting surface on the component 60, in such a manner that the angular pivoting of the sleeve 13 and of the corresponding blade in an upward direction becomes possible, on account of the position then occupied by the pivoting lever 52, and as represented in dot-dash lines in FIG. 1.

On deceleration of the rotor and before it stops, the pivoting in the inverse direction of the lever 52, from the inclined position in dot-dash lines in FIG. 1 towards the vertical position in solid lines, under the action of the restoring spring, again comes to prevent any significant angular movement of the sleeve and of the blade in an upward direction, as indicated previously.

It will be noted that any violent pivoting of a blade in a downward direction, when the speed of rotation of the rotor is below the threshold, tends to involve a large radial displacement of the star-shaped plate 32, by the violent pressing of the runner 47 of this blade flexed in a downward direction against the shoe 36 of the end of the corresponding branch 33 of the plate 32. However, the opposite branch 33 of this plate pushes back, by its shoe 36 and in an upward direction, the runner 47 fixed below the sleeve 13 of the opposite blade. However, as the angular displacement in an upward direction of this opposite blade is prevented by the corresponding pivoting lever 52, a reaction is opposed to such a displacement of the star-shaped plate 32, in such a manner that the latter likewise opposes the violent flexing of the first blade considered.

The combined effects of the upper restrainers which are independent and retractable by the centrifugal force and of the lower restrainers incorporating a reciprocal plate result in the limitation, in this manner, of the angular displacements of the blades in an upward direction, as well as in a downward direction, by virtue of a device which is of low bulkiness and is reliable, on account of the fact that the reciprocal star-shaped plate is mounted in the hub mast, and that the retractable upper restrainers are each accommodated within the corresponding blade sleeve. The industrial construction of the device is relatively simple and economic, and the maintenance and servicing operations are facilitated, on account of the fact that the wear elements 36 and 47 of the lower restrainers are attached by bolting onto parts which are accessible from the outside of the hub mast, and may therefore be exchanged without any further demounting. The star-shaped plate itself may be demounted through the opening of the upper end of the hub mast, without necessitating the separation of the latter from the main gear box on which it is fitted. Finally, the restoring of the star-shaped plate into the mean position by the resilient crown 44, which ensures a restoring not only in its plane but also in rotation, results in a situation in which this plate does not cause any imbalance in flight.

With reference to FIGS. 1 and 2, the device according to the invention has been described as equipping a rotor head incorporating an integrated tubular hub mast according to one of the variants of the patent FR 2,584,996.

However, it is clear that the device according to the invention may just as well equip rotor heads having hub masts according to the other variants described in this patent FR 2,584,996 or alternatively according to the different variants described in the patent FR 2,584,995. These different variants relate to integrated tubular hub masts exhibiting, for each blade, a second opening traversed by the upper branch of the forked piece for connecting the blade to the hub. This second opening may be provided in an extension of the hub mast beyond the rim or the reinforcing belt, or alternatively defined by notches formed in a shroud extending the hub mast and/or in an part of the hub mast extending beyond the belt or the reinforcing rim.

We claim:

1. A flapping restrainer device for the blades of a rotorcraft main rotor, of the type including a hub mast assembly having a retaining means for the retention and articulation of the blades on the hub and at least one tubular part below the retaining means, comprising:

lower flapping restrainer means for restraining flapping of the blades, said lower flapping restraining means comprising at least one rigid component for support of the blades, said at least one rigid component being mounted to slide radially on a support fixed coaxially in the tubular part of the hub mast assembly;

each said blade having a lower supporting runner connected for movement with a root of the respective said blade so as to limit the displacement of each respective said blade in a downward direction by engagement with said at least one rigid component; wherein said at least one rigid component is a plate having a plurality of branches;

resilient restoring means for resiliently biasing said plate toward a predetermined position;

wherein the number of said branches is equal the number of said blades, said plurality of branches being regularly distributed in a circumferential direction about said plate, each of said plurality of branches extending outwardly in a direction which is substantially radial in relation to said plate; each of said plurality of branches being engaged in respective openings disposed in said hub mast assembly, wherein each said lower supporting runner is disposed substantially entirely externally of said hub mast assembly, and wherein each said lower supporting runner is restrained against said external radial end of a corresponding one of said branches to limit downward flapping of each corresponding said blade.

2. The device as claimed in claim 1, wherein each of said plurality of branches has a shape which is substantially rectangular in cross-section and has a substantially constant thickness.

3. The device as claimed in claim 1, wherein said plate including said branches is in a form of a star-shaped plate having a circular central recess.

4. The device as claimed in claim 3, wherein said star-shaped plate is composed of laminated composite materials and comprises a stack of layers or plies of fabrics or laps of synthetic or inorganic fibers having a high mechanical strength and agglomerated by a polymerized synthetic resin.

5. The device as claimed in claim, 1 wherein each of said plurality of branches includes a respective external radial end having with a contact shoe projecting through the corresponding opening of said hub mast assembly.

6. The device as claimed in claim 5, wherein each said contact shoe is a metallic shoe removably mounted on the corresponding one of said plurality of branches.

7. The device as claimed claim 3 wherein said hub mast assembly includes a lower support plate and an upper support component, and said star-shaped plate slides radially on a lower face thereof on said lower support plate, and wherein said star-shaped plate is suspended by its upper face from said upper support component by said resilient restoring means, said lower plate and said upper support component being fixed radially in said hub mast assembly.

8. The device as claimed in claim 7, wherein said resilient restoring means is a coaxial crown or a set of studs which are distributed coaxially in a circumferential direction, and made of a resiliently deformable material.

9. The device as claimed in claim 7 wherein said lower support plate and, said upper support component form part of a guide defining a seating of revolution about the axis of said hub mast assembly.

10. The device as claimed in claim 1, further comprising a plurality of rigid connecting pieces for respectively connecting each said lower supporting runner to a corresponding blade root or with a component for connecting a corresponding blade root to said hub, each said rigid connecting piece being directly fixed below one of said blade root and said connecting component.

11. The flapping restrainer device as claimed in claim 1, further comprising upper restrainers for each blade of said rotor, each said upper restrainer including: an upper supporting component connected for movement with the root of a corresponding blade, an upper stop member which is automatically retractable by a centrifugal force, a pivot, a lever mounted to oscillate on said pivot integral with the hub, a first arm which has a stop finger, a second arm which has a governor weight and a supporting part adapted to abut a supporting surface of said hub, and a restoring spring urging said lever such that, when a speed of rotation of said rotor is below a given threshold, and a stationary position exists in which said supporting part of said second arm of said lever rests against said supporting surface integral with said hub, and said stop finger of said lever is directed towards a corresponding upper supporting component in such a manner as to limit the upward displacement of the corresponding one of said blades by engagement of said supporting component against said stop finger, and such that, when a speed of rotation of said rotor exceeds said given threshold, centrifugal force applied to said governor weight causes pivoting of said lever against said restoring spring in a direction such that said stop finger is separated from a corresponding upper supporting component in such a manner as not to oppose the upward displacement of the corresponding one of said blades, wherein said lever has a pivot axis which is substantially perpendicular to a radial plane passing through the axis of said rotor and a longitudinal axis of the corresponding blade, and said lever is mounted between ends thereof on said pivot in such a manner that is stop finger, in a lower position in relation to said pivot, is pivoted radially inwardly from said stationary position when said governor weight and said second arm, in the upper position in relation to said pivot, are pivoted radially outwardly by centrifugal force.

12. The device as claimed in claim 11, wherein said lever is substantially straight and substantially vertical in said stationary position, and said supporting part of said second arm is a nose projecting substantially radially towards the interior, and which is buttressed against said supporting surface integral with said hub and delimited by a shoulder projecting substantially radially towards an exterior of said hub.

13. The device as claimed in claim 12, wherein said nose projects on said second arm of said lever between said pivot and said governor weight at a free end of said second arm.

14. The device as claimed in claim 11 said supporting surface integral with said hub and a cap in which said pivot is rotatably mounted are portions of a component for fixing on said hub of said retaining means.

15. The device as claimed in claim 11, wherein said upper support component is mounted on a forked piece for connecting the corresponding one of said blades to said hub.

16. A rotor head, for a rotorcraft main rotor having a plurality of blades, of the type comprising a hub mast assembly having at least one tubular part in communication with the exterior of said assembly by openings, the number of which is equal to that of the blades of said rotor and which are formed in said assembly and regularly distributed in a circumferential direction on the latter about an axis of rotation of said rotor, below means for the retention and articulation on said hub of pieces for connecting said blades to said hub, as well as a flapping restrainer device incorporating lower restrainers comprising a reciprocal central restrainer mounted to slide radially on a support fixed coaxially in said tubular part of said hub mast assembly and, for each of said plurality of blades, a lower supporting runner fixed on said corresponding connecting piece, in such a manner as to limit displacement of said blade in a downward direction by cooperation with said reciprocal central restrainer, wherein said flapping restrainer device comprises     lower flapping restrainer means for restraining flapping of the blades, said lower flapping restraining means comprising at least one rigid component for support of the blades, said at least one rigid component being mounted to slide radially on a support fixed coaxially in the tubular part of the hub mast assembly;

each said blade having a lower supporting runner connected for movement with a root of the respective said blade so as to limit the displacement of each respective said blade in a downward direction by engagement with said at least one rigid component; wherein said at least one rigid component is a plate having a plurality of branches;

resilient restoring means for resiliently biasing said plate toward a predetermined position; and     wherein the number of said branches is equal the number of said blades, said plurality of branches being regularly distributed in a circumferential direction about said plate, each of said plurality of branches extending outwardly in a direction which is substantially radial in relation to said plate; each of said plurality of branches being engaged in respective openings disposed in said hub mast assembly, wherein each said lower supporting runner is disposed substantially entirely externally of said hub mast assembly, and wherein each said lower supporting runner is restrained against said external radial end of a corresponding one of said branches to limit downward flapping of each corresponding said blade;

of which each one of said branches of said reciprocal central restrainer is engaged into one of said openings of said hub mast assembly, in such a manner that its external radial end is opposite a corresponding lower supporting runner outside said hub mast assembly.

17. The rotor head as claimed in claim 16, in which said hub mast assembly is an integrated tubular hub mast to which each blade is connected by a forked connecting piece having a lower attachment branch and an upper attachment branch, said lower branch having an internal radial end, at least said lower branch traversing the opening formed in said integrated tubular hub mast and being fixed within said integrated tubular hub mast by said internal radial end to said retaining means for the retention and articulation of said forked piece, wherein, for each of said plurality of blades, the corresponding said lower supporting runner is fixed so as to project below the corresponding said forked piece, said lower attachment branch of which traverses the same opening of said hub mast as that in which there is engaged said branch of said reciprocal central restrainer which cooperates with the corresponding lower supporting runner.

18. The rotor head as claimed in claim 16 in which said retaining means for the retention and articulation of each connecting piece on said hub comprise an armature maintained on a part of said hub by a fixing ferrule which is retained against the periphery of said part of said hub, and in which said flapping device is a device comprising upper retainers, wherein, for each connecting piece said fixing ferrule supports a cap such that it extends substantially radially outwardly, said cap in which rotatably supporting said pivot of said lever of the corresponding said retractable upper stop, and said upper restrainer having a shoulder against which said nose of said lever is supported in said stationary position.

19. The rotor head as claimed in claim 18, in which said piece for connecting each of said plurality of blades to said hub is a sleeve having an internal radial part conformed as a cap having two branches for the attachment on another armature of said retaining means for the retention and articulation on said hub in an internal radial position in relation to said armature maintained on said hub by said ferrule; wherein a corresponding upper supporting component cooperating with said stop finger of a corresponding pivoting lever, in order to limit the displacement of the corresponding one of said plurality of blades in an upward direction, has at least one frustoconical portion formed within said sleeve and/or between said two attachment branches of said internal radial cap of said sleeve which surrounds said pivoting lever.

20. The rotor head as claimed in claim 16 wherein said coaxial support of said reciprocal central restrainer is fixed within said hub mast assembly by connecting means for simultaneously fixing on said hub mast assembly a fastener on which there is articulated a rotating compass for driving, in rotation, said rotating plate of a swashplate pitch control device which is mounted about said hub mast assembly.

21. A flapping restrainer device for the blades of a rotorcraft main rotor, of the type including a hub mast assembly having a retaining means for the retention and articulation of the blades on the hub and at least one tubular part below the retaining means, comprising:

lower flapping restrainer means for restraining flapping of the blades, said lower flapping restraining means comprising at least one rigid component for support of the blades, said at least one rigid component being mounted to slide radially on a support fixed coaxially in the tubular part of the hub mast assembly;

each said blade having a lower supporting runner connected for movement with a root of the respective said blade so as to limit the displacement of each respective said blade in a downward direction by engagement with said at least one rigid component, wherein said at least one rigid component is a plate having a plurality of branches, and wherein the number of said branches is equal the number of said blades, said plurality of branches being regularly distributed in a circumferential direction about said plate, each of said plurality of branches extending outwardly in a direction which is substantially radial in relation to said plate; wherein each of said plurality of branches is engaged in respective openings disposed in said hub mast assembly, each said lower supporting runner is disposed substantially entirely externally of said hub mast assembly, each said lower supporting runner is restrained against said external radial end of a corresponding one of said branches to limit downward flapping of each corresponding said blade, said plate including said branches is star-shaped, and wherein said plate has a circular central recess.

* * * * *

UNITED STATES PATENT AND TRADEMARK OFFICE
CERTIFICATE OF CORRECTION

PATENT NO.  :   5,007,799
DATED       :   April 16, 1991
INVENTOR(S) :   Mouille et al It is certified that error appears in the above-identified patent and that said Letters Patent is hereby corrected as shown below:

On the cover page, Item [73], "Societe Nationale Industrielle et Aerospatiale" should read --Aerospatiale Société Nationale Industrielle--.

Signed and Sealed this

Fourth Day of May, 1993

Attest:

MICHAEL K. KIRK

Attesting Officer

Acting Commissioner of Patents and Trademarks